US005970461A

United States Patent [19]

Chatterton

[11] Patent Number: 5,970,461

[45] **Date of Patent: *Oct. 19, 1999**

[54] SYSTEM, METHOD AND COMPUTER READABLE MEDIUM OF EFFICIENTLY DECODING AN AC-3 BITSTREAM BY PRECALCULATING COMPUTATIONALLY EXPENSIVE VALUES TO BE USED IN THE DECODING ALGORITHM

[75] Inventor: Geoffrey W. Chatterton, Santa Clara, Calif.

[73] Assignee: Apple Computer, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/772,703

[22] Filed: Dec. 23, 1996

[51] Int. Cl.[6] ........ G06K 9/36

[52] U.S. Cl. ........ 704/500; 704/204

[58] Field of Search ........ 704/500, 503, 704/203, 204, 501

[56] References Cited

U.S. PATENT DOCUMENTS 4,829,573 5/1989 Gagnon et al. ........ 381/41
5,007,101 4/1991 Iwahashi et al. ........ 382/42
5,815,206 9/1998 Malladi et al. ........ 704/504

OTHER PUBLICATIONS

Srinivasan et al. VLSI Design of High Speed Time Recursive 2–D DCT/IDCT Process, IEEE Transactions on Circuits and System for Video Technology, vol. 6, Issue 1, Feb. 1996.

Madisetti et al. DCT/IDCT processor design for HDTV applications. Signals, Systems and Electronics, 1995 International Symposium, 1995.

Li, Weiping. A new algorithm to compute the DCT and its invers. IEEE Transactions on Signal Processing, Jun. 1991.

Zhou, Minli. Vector–radix IDCT implementation for MPEG decoding. ASIC Conference and Exhibit, 1995.

Wang, Zhongde. Recursive Algorithms for the forward and inverse discrete cosine transform. IEEEE Signal Processing Letters, Jul. 1994.

"Design and Implementation of AC–3 Coders," Steve Vernon, IEEE Transactions on Consumer Electronics, vol. 41, No. 3, Aug. 3, 1995.

Digital Audio Compression Statndard (AC–3) pp. 87–93, Dec. 1995.

Beyer, William. CRC Standard Mathematical Tables. CRC Press, Inc. Florida, 1981.

*Primary Examiner*—David R. Hudspeth
*Assistant Examiner*—M. David Sofocleous
*Attorney, Agent, or Firm*—Sawyer & Associates

[57] ABSTRACT

A method and system for providing an inverse transform for an audio compression decoding algorithm in software precalculates a plurality of identified values; each of which is computationally intensive. The method and system then performs a pre-inverse transform complex multiply utilizing a first portion of the identified values and an array of input coefficients to provide a plurality of intermediate values. Thereafter, an inverse transform complex multiply and a post inverse transform multiply are combined to provide a combined complex multiply operation. The combined complex multiply operation uses a second portion of the identified values and the intermediate values provides the inverse transform. Accordingly, through the use of the present invention, the number of instructions for implementing the inverse transform can be substantially minimized. In the prior art, the method for performing the inverse discrete cosine transform (IDCT) in the AC-3 algorithm is extremely inefficient for software decoder implementations. Through the use of the present invention, the algorithm performance on a superscalar processor as measured by issued instructions is improved by a factor on the order of 43.

27 Claims, 16 Drawing Sheets

FIG. 6B (PRIOR ART)

500

```
Published algorithm:
    xcos [k] = -cos(2*π* (8*k+1) / (8*N) ) ;
    xsin [k] = -sin(2*π* (8*k+1) / (8*N) ) ;
```

EQ.1 (502)

```
for (k=0; k<N/4; k++)
{
        Z[k] =     (X[N/2-2*k-1] * xcos [k] - x[2*k]         * xsin [k]) +
               j * (X[2*k]       * xcos [k] + X[N/2-2*k-1]   * xsin [k]);
}
```

EQ.2 (504)

```
for (n=0; n<N/4; n++)
{
        z[n] =  0;
        for  (k = 0; k< N/4; k++)
        {
             z[n] += Z[k] * [ (cos(8*π*k*n/N) + j * sin(8*π*k*n/N) ) ]
        }
}
```

EQ.3 (506)

```
for (n=0; n<N/4; n++)
{
     y[n] = (zr[n] *xcos[n] - zi [n] *xsin [n] ) +
            j * (zi[n] *xcos [n] + zr [n] *xsin [n] ) ;
}
```

403 (Z[k]), 405 (z[n] +=), 407 (y[n]), 508 (xsin), 510 (xcos), 511 (π), 512 (cos(8*π*k*n/N)), 514 (sin(8*π*k*n/N)), 516 (N/2-2*k-1), 518 (2*k), 520 (zr), 522 (zi)

loop pseudocode (11 instructions/z-value):

```
lfsu evenEntry, 8 (lastEvenEntry)
lfsu xsinValue,  4 (lastXSinValue)

lfsu xcosValue, 4 (lastXCosValue)

fmul temp1, evenEntry, xsinValue
fmul temp2, evenEntry, xcosValue

lfsu oddEntry, -8(lastOddEntry)

fmsub  zReal, oddEntry, xcosValue, temp1
fmadd  zImag, oddEntry, xsinValue, temp2

stfsu zReal, 4(zPtr)
stfsu zImag, 4(zPtr)

bdnz
```

FIG. 9

```
for (n=0; n<N/4; n++)
{
    ziCurrent = 0;
    zrCurrent = 0;
    for (k = 0; k < N/4; k++)
    {
        zrCurrent += (zReal[k] * cosValue[(n * 128) + k]) -
                     (zImag[k] * sinValue[(n * 128) + k])
        ziCurrent += (zReal[k] * sinValue[(n * 128) + k]) +
                     (zImag[k] * cosValue[(n * 128) + k])
    }

    y[n] = (zrCurrent*xcos[n] - ziCurrent*xsin[n]) +
           j * (ziCurrent*xcos[n] + zrCurrent*xsin[n]);
}
```

904

906

FIG. 10

FIG. 11

```
for (n=0; n<N/4; n++)
{
    ziCurrent = 0;
    zrCurrent = 0;
    loop mz count = 0;
                                                        906'
    for (k = 0; k < N/16; k++)
    {
        zrCurrent += (zReal[count] * cosValue[(n * 128) + count]) -
904'                 (zImag[count] * sinValue[(n * 128) + count])
        ziCurrent += (zReal[count] * sinValue[(n * 128) + count]) +
                     (zImag[count] * cosValue[(n * 128) + count])
        count++;

        zrCurrent += (zReal[count] * cosValue[(n * 128) + count]) -
904'                 (zImag[count] * sinValue[(n * 128) + count])
        ziCurrent += (zReal[count] * sinValue[(n * 128) + count]) +
                     (zImag[count] * cosValue[(n * 128) + count])
        count++;

        zrCurrent += (zReal[count] * cosValue[(n * 128) + count]) -
904'                 (zImag[count] * sinValue[(n * 128) + count])
        ziCurrent += (zReal[count] * sinValue[(n * 128) + count]) +
                     (zImag[count] * cosValue[(n * 128) + count])
        count++;

        zrCurrent += (zReal[count] * cosValue[(n * 128) + count]) -
904'                 (zImag[count] * sinValue[(n * 128) + count])
        ziCurrent += (zReal[count] * sinValue[(n * 128) + count]) +
                     (zImag[count] * cosValue[(n * 128) + count])
        count++;
    }
        y[n] = (zrCurrent*xcos[n] - ziCurrent*xsin[n]) +
               j * (ziCurrent*xcos[n] + zrCurrent*xsin[n]);
}
```

```
outerLoop:
        li          zrCurrent, 0
        li          ziCurrent, 0

innerLoop:
        <insert accumulator code>   904'
        <insert accumulator code>   904'
        <insert accumulator code>   904'
        <insert accumulator code>   904'
        bdnz innerLoop

        lfsu  xsinValue,  4(lastXSinValue)
        lfsu  xcosValue, 4(lastXCosValue)

        fmul  temp1, ziCurrent, sinValue
        fmsub yReal, zrCurrent, cosValue, temp1

        fmul  temp1, ziCurrent, cosValue
        fmadd yImag, zrCurrent, sinValue, temp1

        stfsu yImag, 4(prevYImag)
        stfsu yReal, 4(prevYReal)

        subic.
        bne outerLoop
```

FIG. 12

SYSTEM, METHOD AND COMPUTER READABLE MEDIUM OF EFFICIENTLY DECODING AN AC-3 BITSTREAM BY PRECALCULATING COMPUTATIONALLY EXPENSIVE VALUES TO BE USED IN THE DECODING ALGORITHM

FIELD OF THE INVENTION

The present invention relates generally to audio compression decoding and more particularly to a system and method for optimizing an inverse transform for audio compression decoding.

BACKGROUND OF THE INVENTION

In order to more efficiently broadcast or record audio signals, it may be advantageous to reduce the amount of information required to represent the audio signals. Typically, this information may be stored as pulse code modulations (PCM) samples. In the case of digital audio signals, stored as PCM samples, the amount of digital information needed to accurately reproduce the original pulse code modulation (PCM) samples may be reduced by applying a digital compression algorithm, resulting in a digitally compressed representation of the original signal. (The term "compression" used in this context means the compression of the amount of digital information which must be stored or recorded.)

The goal of the digital compression algorithm is to produce a digital representation of an audio signal which, when decoded and reproduced, sounds the same as the original signal, while using a minimum of digital information (bit-rate) for the compressed (or encoded) representation. The ATSC digital television standard and the digital video disk (DVD) video standard call for audio compression using AC-3 which was developed by DOLBY LABORATORIES. AC-3, a standard digital compression technique, can encode from 1 to 5.1 channels of source audio from a PCM representation into a serial bit stream at data rates ranging from 32 kbps to 640 kbps. What is meant by 5.1 is five discrete channels plus the 0.1 channel which is a fractional bandwidth channel intended to convey only low frequency (subwoofer) signals.

A typical application of this algorithm is shown in FIG. 1. In this example, a 5.1 channel audio program is converted from a PCM representation requiring more than 5 Mbps (6 channels×48 kHz×18 bits=5.184 Mbps) into a 384 kbps serial bit stream by the AC-3 encoder 12. Transmission equipment 14 converts this bit stream to a radio frequency (RF) transmission which is directed to a transponder 16. The amount of bandwidth and power required by the transmission has been reduced by more than a factor of 13 by the AC-3 digital compression. The signal received from the satellite 15 is demodulated back into the 384 kbps serial bit stream by reception equipment 17, and decoded by the AC-3 decoder 18. The result is the original 5.1 channel audio program.

Digital compression of audio is useful wherever there is an economic benefit to be obtained by reducing the amount of digital information required to represent the audio. Typical applications are in satellite or terrestrial audio broadcasting, delivery of audio over metallic or optical cables, or storage of audio on magnetic, optical, semiconductor, or other storage media.

Referring to FIG. 2, the important features of the decoder are shown in block 20. The encoded bit stream is checked for errors and is deformatted to provide various types of data such as the encoded spectral envelope and the quantized mantissas. The bit allocation routine 22 is run and the results used to unpack and dequantize the mantissas. The spectral envelope is decoded via block 26 to produce the exponents. The exponents and mantissas are transformed back into the time domain via synthesis filter block 208 to produce the decoded PCM time samples.

Prior to transforming the audio signal from time to frequency domain, the encoder performs an analysis of the spectral and/or temporal nature of the input signal and selects the appropriate block length. This analysis occurs in the encoder only, and therefore can be upgraded and improved without altering the existing base of decoders. In this embodiment, a one bit code per channel per transform block is embedded in the bit stream which conveys length information. The decoder uses this information to deformat the bit stream, reconstruct the mantissa data, and apply the appropriate inverse transform equations. These inverse transform equations are computationally expensive and represent a significant portion of the operation on the bit stream.

A specification for the AC-3 algorithm, referred to as the ATSC specification A/52, is a published technical description of the AC-3 algorithm. The method for performing the inverse transform or inverse discrete cosine transform (IDCT) in the AC-3 algorithm is designed to work efficiently in hardware such as DSP devices, and is extremely inefficient for software decoder implementations. By strictly following the above-identified specification, the software implementation can require as much as 7,400,000 processor instructions per inverse transform. This large number of instructions requires a significant software overhead to complete. Accordingly, a method and system for significantly reducing the number of instructions for providing an inverse transform is desired.

Accordingly, what is needed is a method and system for decoding compressed audio signals in a software implementation. More particularly, what is needed is a system and method for reducing the number of software instructions required for providing an inverse transform for bit stream decoding. The present invention addresses such a need.

SUMMARY OF THE INVENTION

The present invention is a method and system for providing an inverse transform for an audio compression decoding algorithm in software precalculates a plurality of identified values; each of which is computationally intensive. The method and system then performs a pre-inverse transform complex multiply utilizing a first portion of the identified values and an array of input coefficients to provide a plurality of intermediate values. Thereafter, an inverse transform complex multiply and a post inverse transform multiply are combined to provide a combined complex multiply operation. The combined complex multiply operation uses a second portion of the identified values and the intermediate values to provide the inverse transform.

Accordingly, through the use of the present invention, the number of instructions for implementing the inverse transform can be substantially minimized. In the prior art, the method for performing the inverse discrete cosine transform (IDCT) in the AC-3 algorithm is extremely inefficient for software decoder implementations. Through the use of the present invention, the algorithm performance on a superscalar processor as measured by issued instructions is improved by a factor on the order of 43.

BRIEF DESCRIPTION OF THE DRAWINGS

FIG. 6B illustrates a high level pseudocode implementation of the simple block diagram of FIG. 6A.

FIG. 9 illustrates assembly code that implements the features of the pre-inverse transform complex multiply step.

FIG. 10 is a first example of high level pseudocode for implementing the combined inverse transform and post inverse transform complex multiply step in accordance with the present invention.

FIG. 11 is a second example of high level pseudocode for implementing the combined inverse transform and post inverse transform complex multiply step in accordance with the present invention.

FIG. 12 illustrates an exemplary assembly pseudocode utilizing Power PC instructions which implement the high level code of FIG. 11.

DESCRIPTION OF THE INVENTION

The present invention relates to an improvement in decoding compressed audio signals in a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
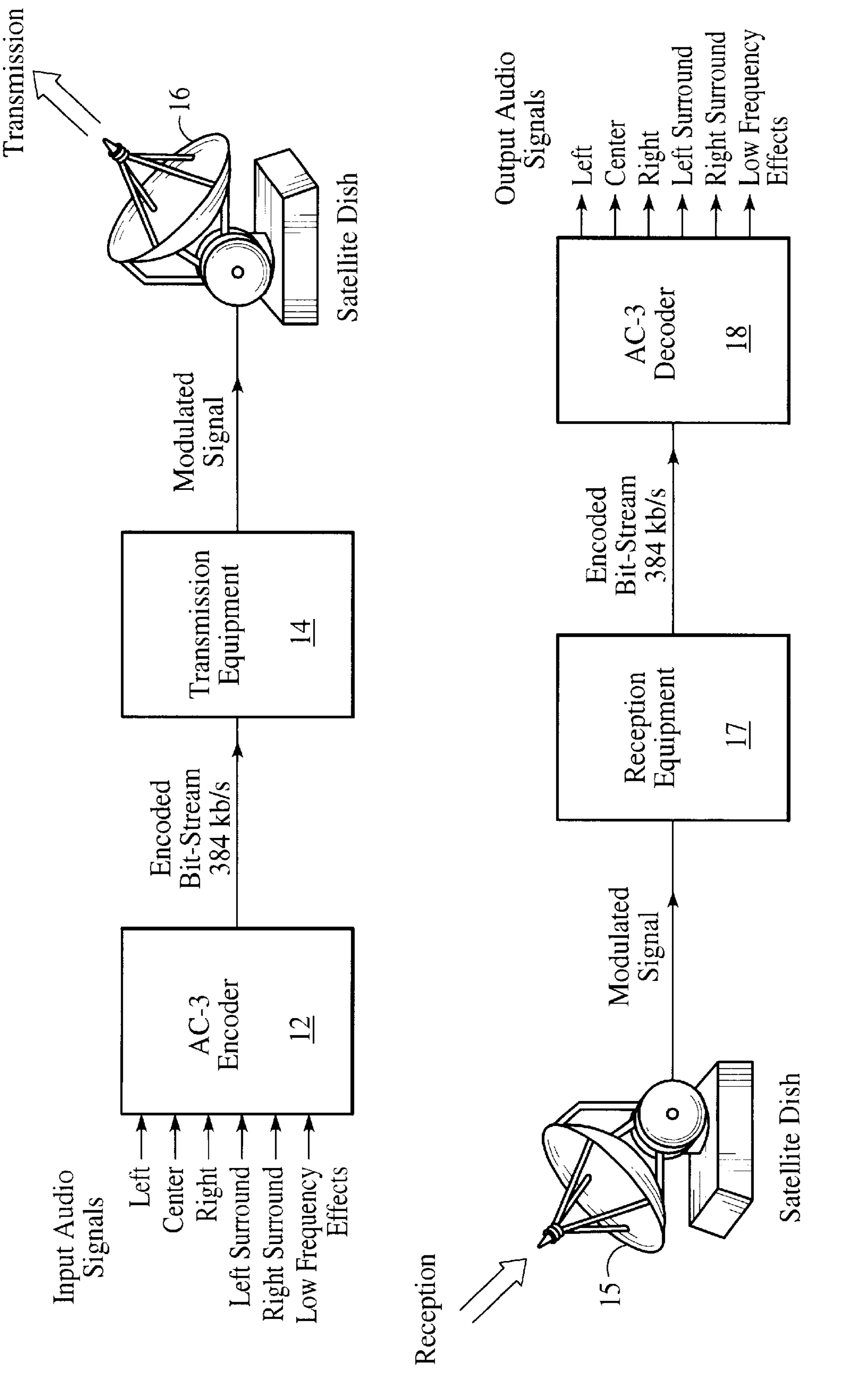
FIG. 1 (PRIOR ART)
FIG. 1 shows a typical application of the AC-3 algorithm.
Figure 2:
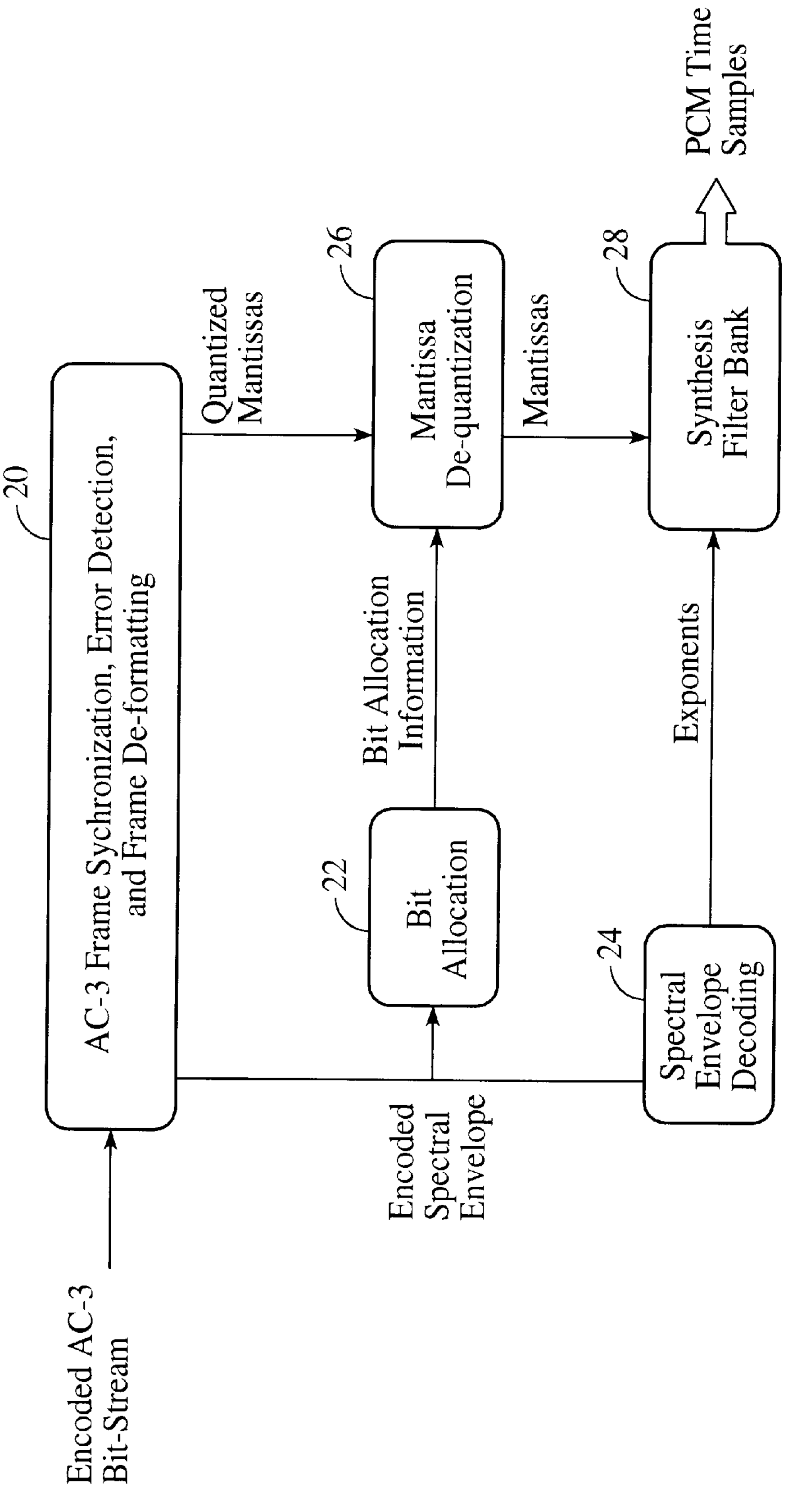
FIG. 2 (PRIOR ART)
FIG. 2 shows features of a decoder utilized with the AC-3 algorithm.
Figure 3:
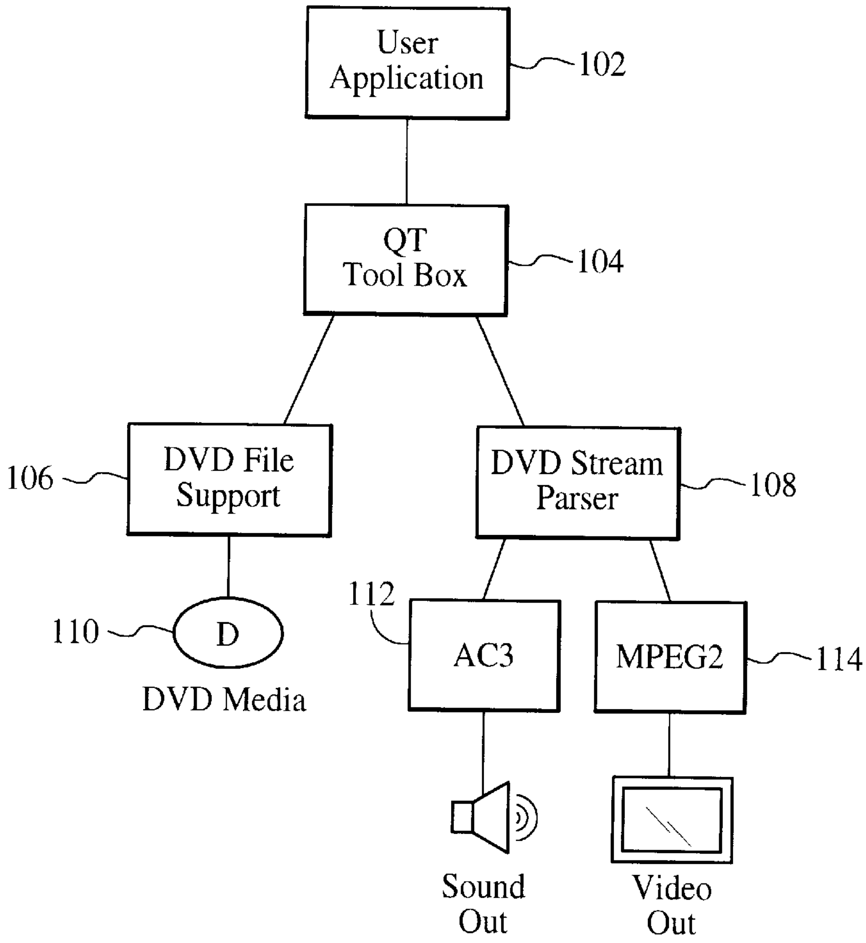
FIG. 3 (PRIOR ART)
FIG. 3 illustrates a diagram of an implementation of a system in which an audio compression decoding arrangement is utilized.

FIG. 3 illustrates a diagram of an implementation of a system in which an audio decoding arrangement is utilized. Such an arrangement uses a user application 102 which in turn uses functions implemented in a toolbox 104 such as a Quick Time (QT) Toolbox. The toolbox 104 provides for digital video disk (DVD) file support 106 for a digital video media 110, and provides the data to a DVD stream parser 108. The stream parser 108 provides data for a MPEG decompression device 114 which provides a video output, and/or data for audio to an AC-3 decoder 112 for output ultimately to a speaker.

Figure 4:
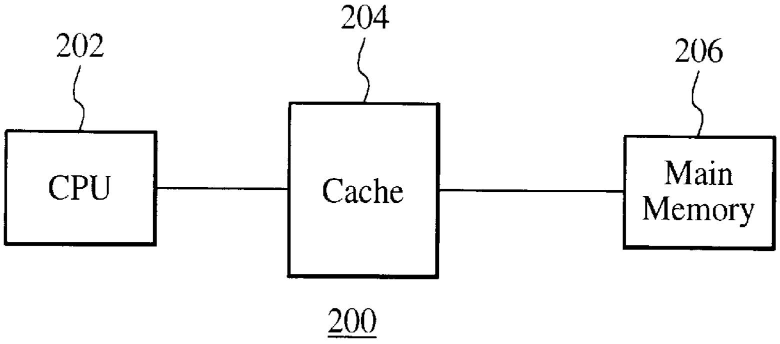
FIG. 4 (PRIOR ART)
FIG. 4 illustrates a block diagram of a processing system.

This arrangement is typically used on a processing system 200 as shown in FIG. 4. The processing system 200 includes a CPU 202 which, for example, could be a Power PC processor, coupled to a cache 204 which in turn is coupled to main memory 206. Power PC processors are widely available from IBM and Motorola.

Figure 5:
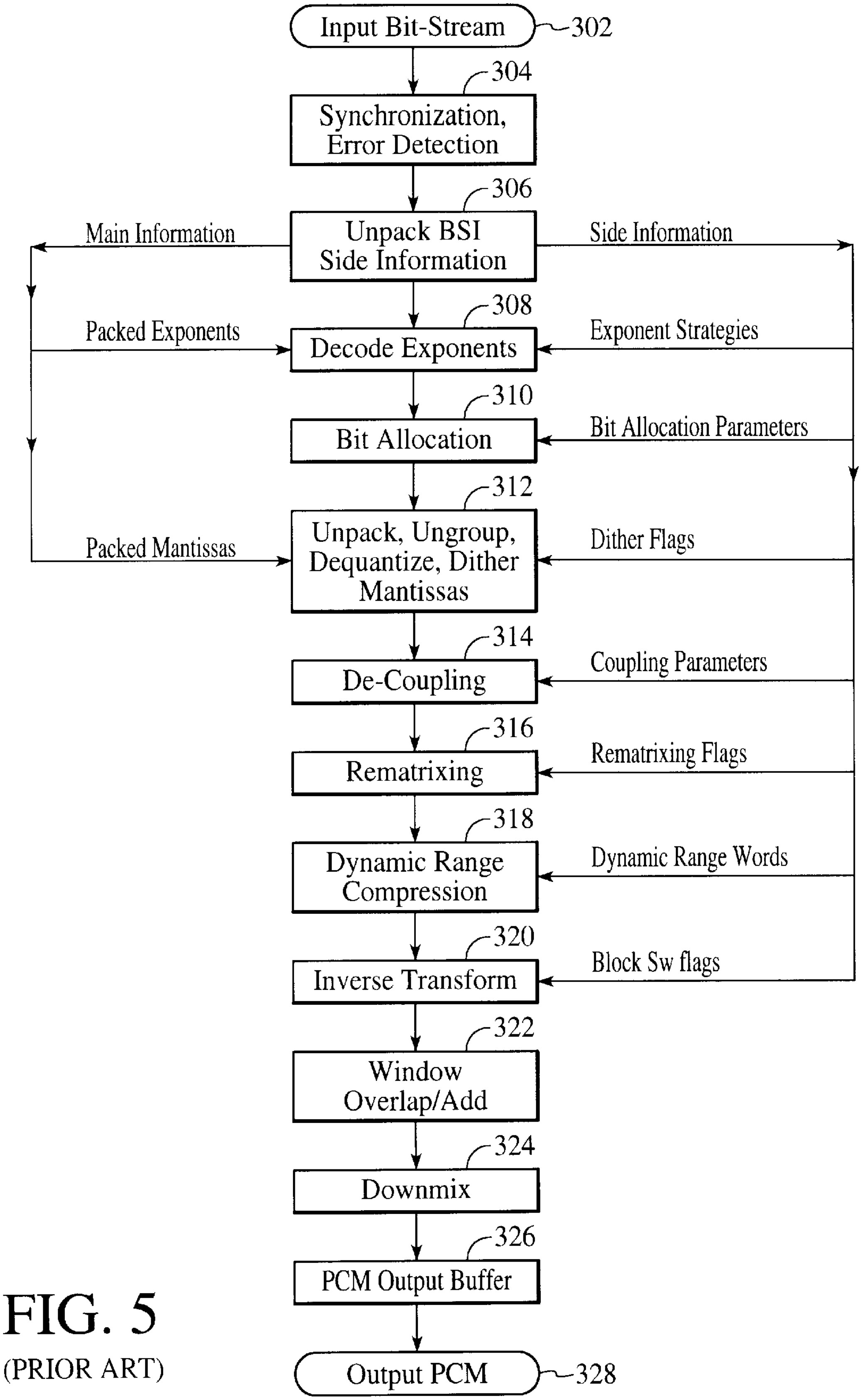
FIG. 5 (PRIOR ART)
FIG. 5 illustrates a flow chart of the decoding process for a digital audio compression system.

FIG. 5 illustrates a flow chart for an AC-3 audio decoding process which could be utilized in the process and system of FIGS. 3 and 4. The following description provides an overview of the AC-3 decoding process, in which the decoding process flow is shown as a sequence of blocks, and some of the information flow is indicated by arrowed lines.

Input Bit Stream 302

The input bit stream will typically come from a transmission or storage system such as the DVD disk 110 illustrated in FIG. 3.

Synchronization and Error Detection 304

The AC-3 bit-stream format allows rapid synchronization.

Unpack BSI, Side Information 306

Inherent to the decoding process is the unpacking (demultiplexing) of the various types of information included in the bit stream. A portion of these items may be copied from an input buffer to dedicated registers, others may be copied to specific working memory location, and some of the items may simply be located in the input buffer with pointers to them saved to another location. Finally, a portion of items may simply be located in the input buffer with pointers to them saved to another location for use when the information is required.

Decode Exponents 308

The exponents are delivered in the bit stream in an encoded form. In order to unpack and decode the exponents two types of side information are required. First, the number of exponents must be known. Second, the exponent strategy in use by each channel must be known.

Bit Allocation 310

The bit allocation computation reveals how many bits are used for each mantissa. The inputs to the bit allocation computation are the decoded exponents, and the bit allocation side information.

Process Mantissas 312

The coarsely quantized mantissas make up the bulk of the AC-3 data stream. Each mantissa is quantized to a level of precision indicated by the corresponding bit allocation pointer. In order to pack the mantissa data more efficiently, some mantissas are grouped together into a single transmitted value.

De-coupling 314

When coupling is in use, the channels which are coupled must be decoupled. Decoupling involves reconstructing the high frequency section (exponents and mantissas) of each coupled channel, from the common coupling channel and the coupling coordinates for the individual channel. Within each coupling band, the coupling channel coefficients (exponent and mantissa) are multiplied by the individual channel coupling coordinates.

Rematrixing 316

In an audio coding mode some rematrixing may be employed, as indicated by the rematrix flags. Where the flag indicates a band is rematrixed, the coefficients encoded in the bit stream are sum and difference values instead of left and right values.

Dynamic Range Compression 318

For each block of audio a dynamic range control value (dynmg) may be included in the bit stream. The decoder, by default, shall use this value to alter the magnitude of the coefficient (exponent and mantissa).

Inverse Transform 320

The decoding steps described above will result in a set of frequency coefficients for each encoded channel. The inverse transform converts the blocks of frequency coefficients into blocks of time samples.

Window, Overlap/Add 322

The individual blocks of time samples must be windowed, and adjacent blocks must be overlapped and added together in order to reconstruct the final continuous time output PCM audio signal.

Downmixing 324

If the number of channels required at the decoder output is smaller than the number of channels which are encoded in the bit stream, then downmixing is required. Downmixing in the time domain is shown in this example decoder.

PCM Output Buffer 326

Typical decoders will provide PCM output samples at the PCM sampling rate. Since blocks of samples result from the decoding process, an output buffer is typically required.

Output PCM 328

The output PCM samples may be delivered in form suitable for interconnection to a digital to analog converter (DAC), or in any other form.

To implement this flow in software requires various instructions for each of the above-identified operations. However, the instructions required for the inverse transform operation 320 of FIG. 5 are particularly computationally expensive. As before discussed, the published method for performing the inverse transform in the AC-3 algorithm disclosed in the ATSC specification is directed toward hardware implementations and is extremely inefficient for software decoder implementations. For example, in the embodiment of direct implementation of this specification, over 7,400,000 instructions are required to compute the inverse transform of each block.

Figure 6A:
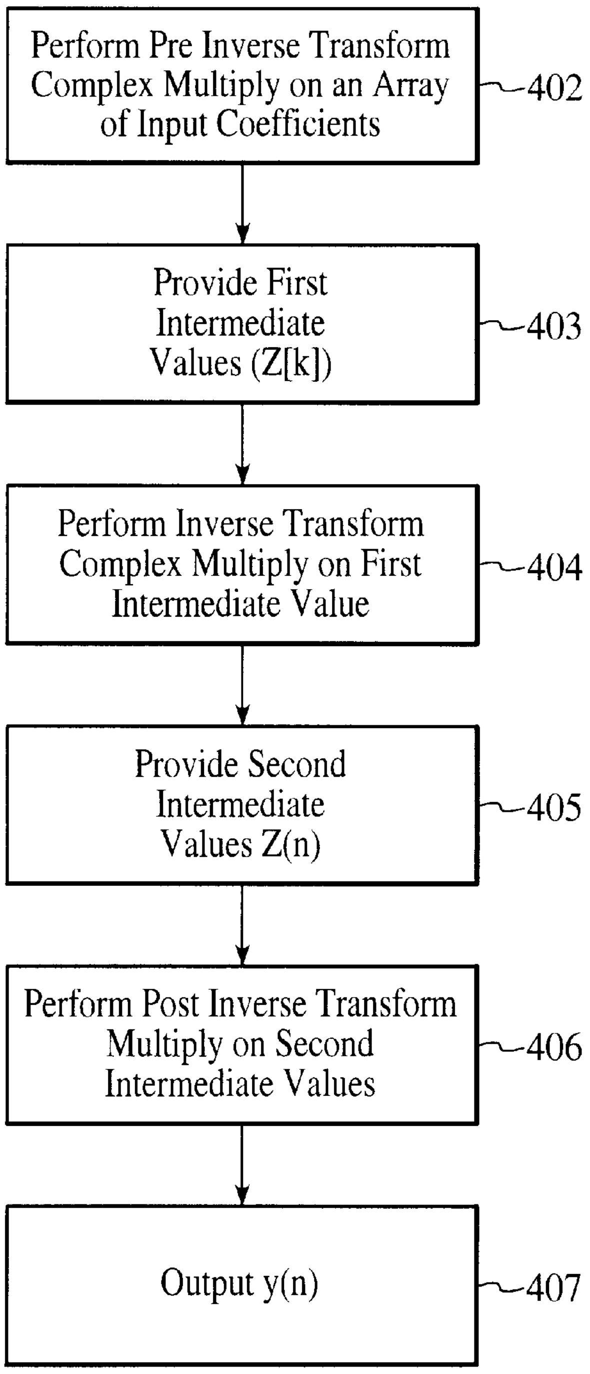
FIG. 6A (PRIOR ART)
FIG. 6A illustrates a simple block diagram of a portion of the inverse discrete cosine transform (IDCT) for the AC-3 decoding algorithm according to the ATSC digital television standard.
Figure 6C:
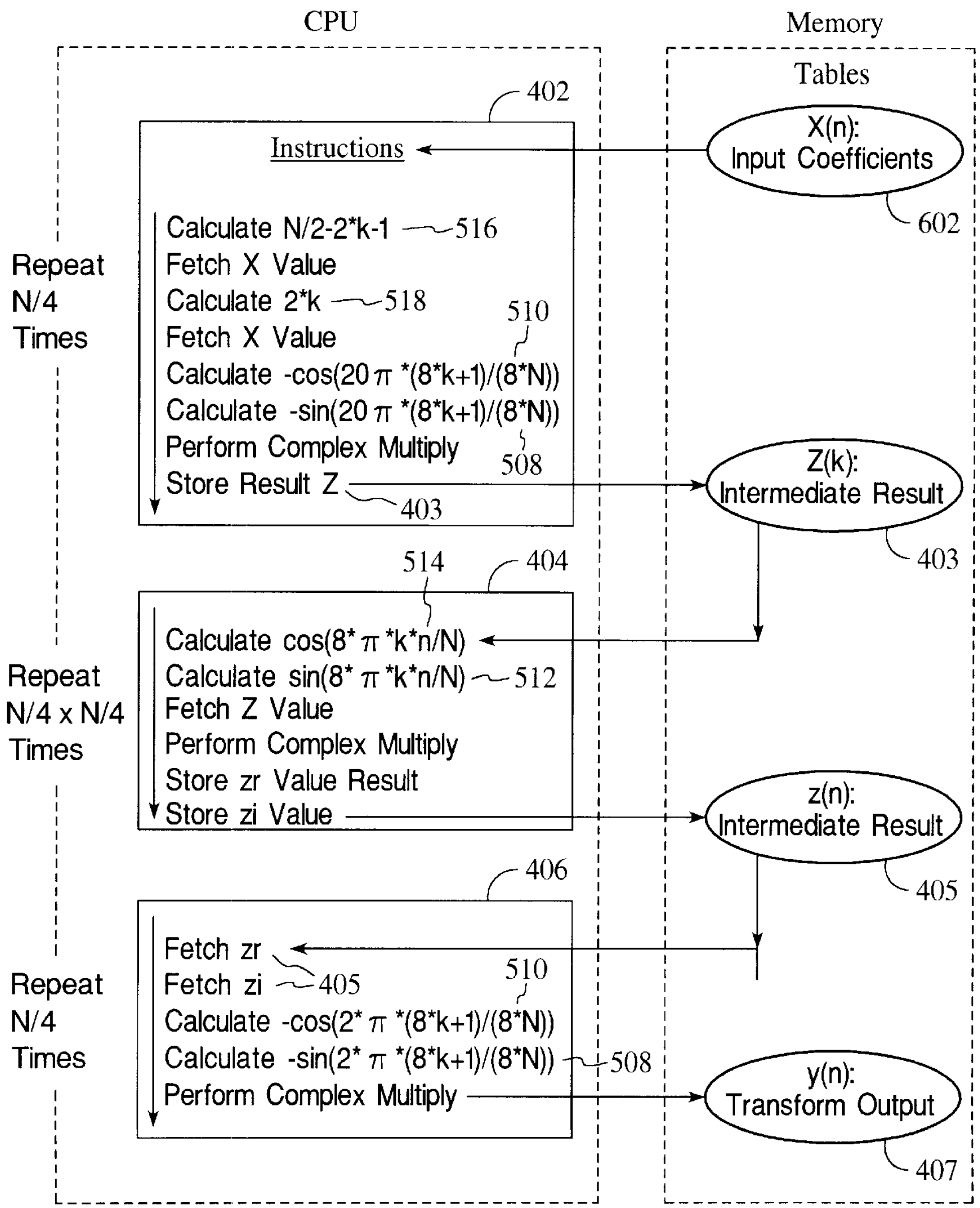
FIG. 6C is a flow diagram of the operation of the pseudocode of FIG. 6B when implemented directly in software operating in conjunction with the CPU and main memory of FIG. 4.

To more clearly describe the process of an audio decoding algorithm with the implementation of an inverse discrete cosine transform (IDCT), refer now to FIGS. 6A, 6B and 6C.

FIG. 6A illustrates a simple block diagram of a portion of the inverse discrete cosine transform (IDCT) for the AC-3 decoding algorithm according to the ATSC digital television standard. In this embodiment, first a pre-inverse transform complex multiply 402 operates on an array of input coefficients to provide a first intermediate set of values, via Z(k) step 403. Next, in the inverse transform multiply step 404, this first intermediate set of values is operated on to provide a second intermediate set of values via z(n) step 405. Finally in the post inverse transform complex multiply step 406, this second intermediate set of values is operated on to provide the inverse transform output, y(n) step 407. The direct implementation of this algorithm in software requires a complex calculation and a large number of instructions to execute. To illustrate this problem in a more detailed manner refer now to FIG. 6B.

FIG. 6B illustrates a high level pseudocode implementation 500 of the simple block diagram of FIG. 6A. In the following example, the term "N" represents the number of input coefficients required to provide the IDCT output. The terms "k" and "n" represent loop counters for indexing the array input of coefficients. The pseudocode 500 includes a first loop 502 which corresponds to the pre-inverse transform multiply step 402 of FIG. 6A, a second loop 504 which corresponds to inverse transform complex multiply step 404 of FIG. 6A, and a third loop 506 which corresponds to the post inverse transform complex multiply step 406 of FIG. 6B.

The pseudocode 500 also includes several functions that when implemented in software require many instructions. For example, different values of the xsin function 508 and xcos function 510 are needed in each iteration of loops 502 and 506 (the equations for which are shown at the legend 511). The xsin and xcos functions 508 and 510 require many instructions to calculate when implemented in software. Similarly, the terms designated as 512 and 514 also require many instructions to calculate (due to the sine and cosine functions included therein) and need to be recalculated for each iteration of the inner loop of 504. Furthermore, the values designated as 516 (N/2−2*k−1) and 518 (2*k) must also be calculated multiple times, and each calculation requires many instructions. Further calculations include: the multiplication of zr(n) 520, the real value of z(n) 405, with xsin and xcos functions 508 and 510; and the multiplication of zi(n) 522, the imaginary value of z(n) 405, with xsin and xcos functions 508 and 510. To further illustrate the problems with directly implementing the high level pseudocode 500 in software, refer now to FIG. 6C.

FIG. 6C is a flow diagram of the operation of the pseudocode 500 of FIG. 6B when implemented directly in software operating in conjunction with the CPU 202 and main memory 206 of FIG. 4. As is seen, in the pre-inverse transform step 402, the CPU 202 receives input coefficients 602 from the main memory 206. As has been before described in this step, terms 508, 510, 516 and 518 are calculated to provide a set of N/4 elements in length to provide a first set of intermediate values Z(k) 403.

In the inverse transform complex multiply step 404, the CPU 202 accesses each of the elements of Z(k) value 403. Each of the elements of Z(k) 403 are multiple by the terms 512 and 514 to provide a second intermediate set of values z(n) 405, which are stored in main memory 206.

In the post inverse transform multiply step 406, the second intermediate set of values z(n) 405 are accessed by the CPU 202 and terms 508 and 510 are utilized to provide the only values for the inverse transform output (n) step 407.

Thus as shown in FIGS. 6A–6C, several complex calculations are required involving numerous parameters, as well as repeated and nested do-loops to provide the inverse transform. In addition, the storing and retrieving of numerous intermediate values (Z(k) 403) and (z(n)) 405) significantly affects the overall performance in providing the inverse transform output since the numerous accesses to the main memory slows operations. Accordingly, what is needed is a method and system for overcoming the above-identified problems associated with implementing the algorithm of FIGS. 6A–6C directly in software.

A method and system in accordance with the present invention addresses these problems. To more fully describe the features of the present invention, refer now to the following discussion in conjunction with the accompanying figures.

Figure 7A:
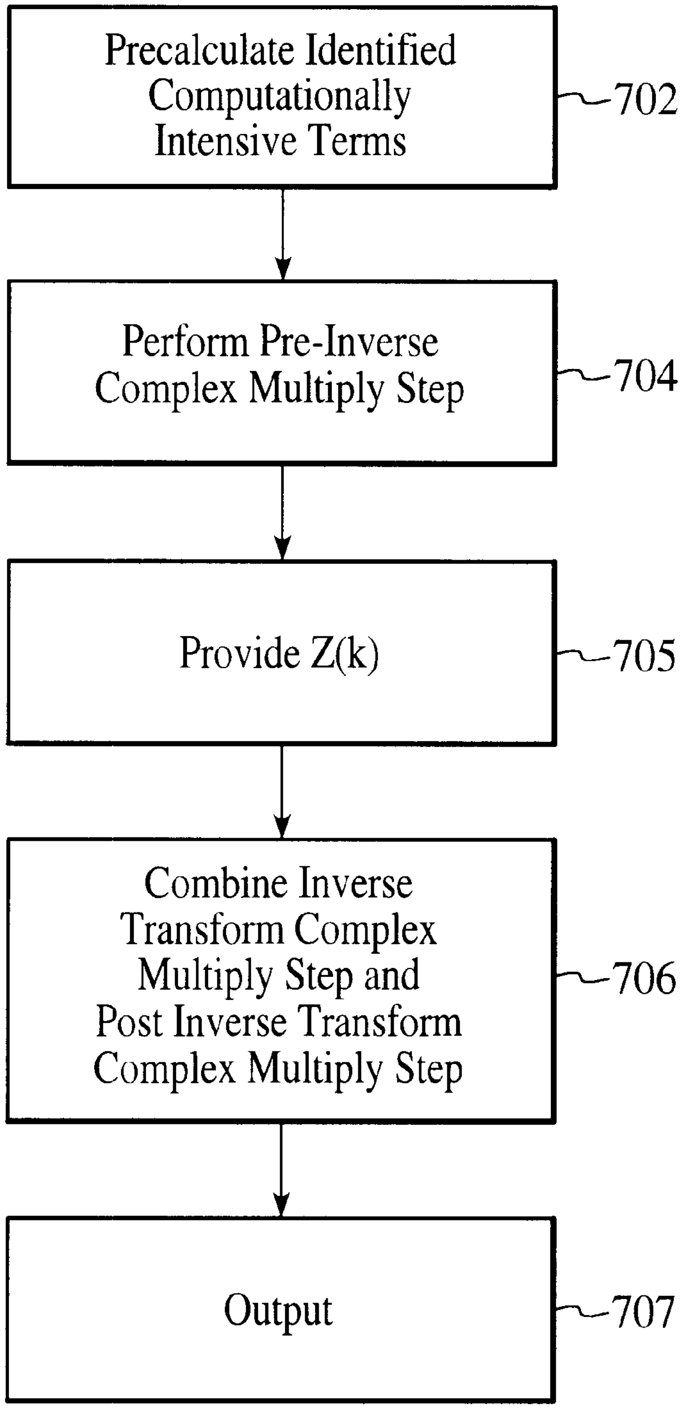
FIG. 7A is a simple block diagram of an implementation of the high level pseudocode of FIG. 6B in accordance with the present invention.

FIG. 7A is a simple block diagram of an implementation of the high level pseudocode of FIG. 6B in accordance with the present invention. As is seen, first, a plurality of identified values, the calculation of each which is computationally intensive of the algorithm are precalculated and placed in tables, via step 702. Next, the pre-inverse transform complex multiply step is performed via step 704 and a first intermediate value is provided via step 705. The inverse transform complex multiply step and post inverse transform complex multiply step are combined to provide a complex multiply operation, via step 706 to provide the inverse transform output, via step 707.

By precalculating identified computationally intensive terms, via step 702, many software instructions are saved thereby reducing the time required to execute the inverse transform. Also by combining the inverse transform complex multiply and post inverse transform complex multiply to provide the complex multiply operation, via step 706, one set of intermediate values does not have to be maintained in main memory. Thus, numerous accesses to the main memory are minimized further improving the overall performance of a computer system when the inverse transform is implemented in accordance with the present invention.

Figure 7B:
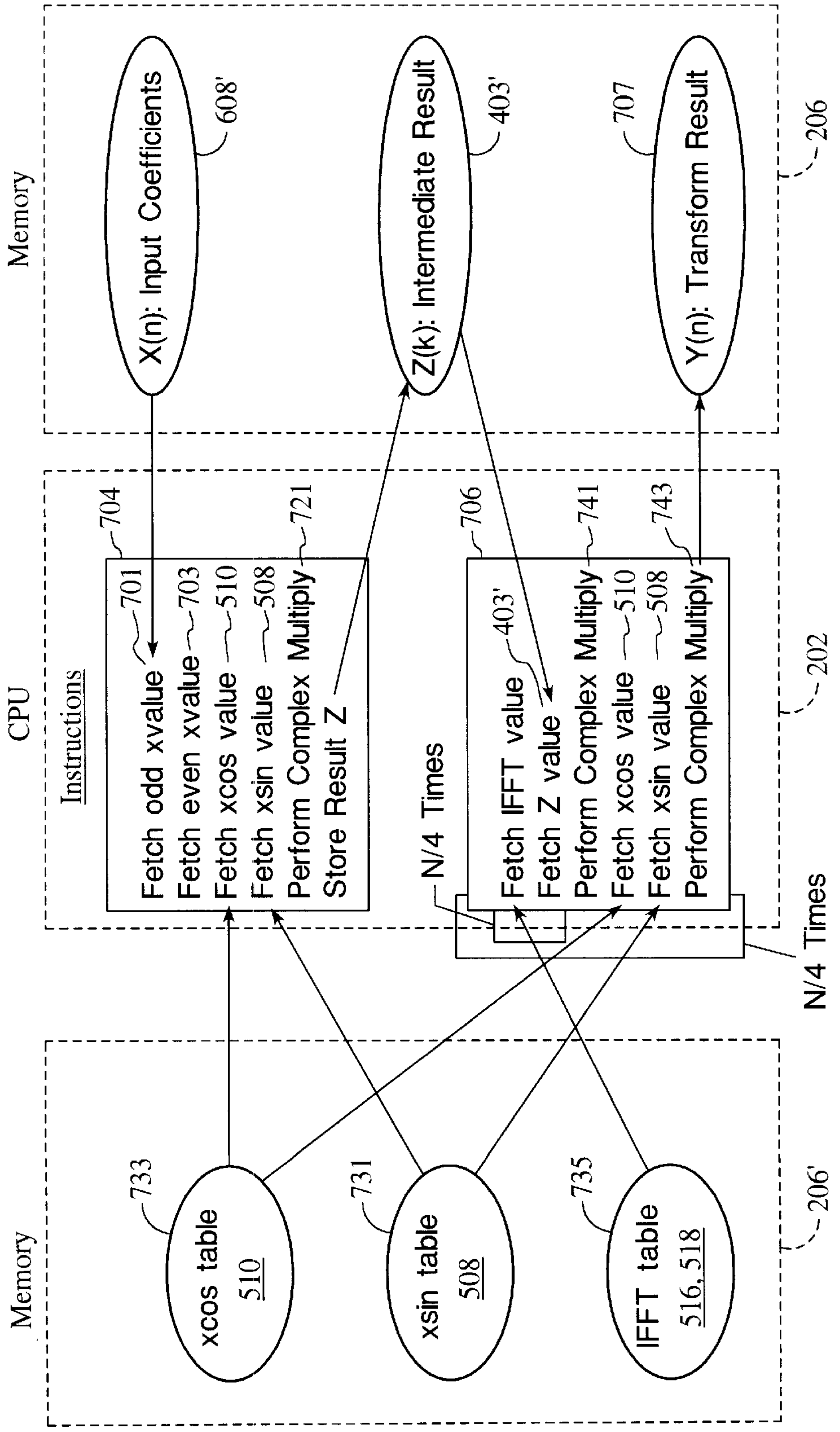
FIG. 7B is a flow diagram of the operation of the block diagram of FIG. 7A when implemented in accordance with the present invention operating on the CPU and main memory of FIG. 4.

To more fully illustrate operation of the present invention when implementing the block diagram of FIG. 7A, refer now to FIG. 7B. FIG. 7B is a flow diagram of the operation of the block diagram of FIG. 7A when operating within the CPU 202 and main memory 206 of FIG. 4. The values for the xsin function 508 are precalculated and placed in table 731, the values for xcos function 510 (FIG. 6B) are precalculated and placed in table 733 and the values for the terms 516 and 518 (FIG. 6B), hereinafter referred to as IFFT terms, are precalculated and placed in table 735 in the memory 206'.

The tables 731, 733 and 735 are shown in a separate memory 206' for ease of illustration. However, one of ordinary skill in the art readily recognizes, the main memory 206 could contain these values and it would be within the spirit and scope of the present invention.

The values from xcos table 733 and xsin table 731 are provided to the inverse transform complex multiply step 704 and the combined inverse transform and post inverse transform complex multiply step 706. The values from the IFFT table 735 are provided to the combined inverse transform and post inverse transform complex multiply step 706. The precalculation of computationally intensive values and providing them in tables significantly reduces the number of instructions required for providing the inverse transform.

In operation, the pre-inverse transform multiply 704 receives input coefficients X(n) 608' from the memory 206. The odd X entry and the even X entry values 701 and 703 are fetched in pre-inverse transform multiply 704, and are to be multiplied by the terms 516 and 518 (FIG. 6B), respectively. As will be discussed later, these values can be retrieved from memory 206 in a predetermined manner to eliminate many calculations. Therefore, the only remaining computationally intensive calculation is the complex multiply 721 within the step 704. This pre-inverse transform 704 provides the intermediate set of values Z(k) 403'. This intermediate set of values which is the same as that produced in FIG. 6B at step 502 is then accessed by the CPU 202 to be operated on by the combined complex multiply step 706.

In the combined inverse transform and post inverse transform complex multiply step 706 the only remaining computationally intensive calculations are the two complex multiply steps 741 and 743. In addition, a set of intermediate values which were stored in the main memory 206 in FIG. 6C (z(n) 405 in FIG. 6B and 6C) can now be stored in registers within the CPU 202 in FIG. 7B and used quickly, thereby minimizing accesses to the main memory 206. The combined inverse transform and post inverse transform complex multiply step 706 provides the inverse transform output 707.

Accordingly, through a system and method in accordance with the present invention, the IDCT can be implemented in a more efficient manner than in previously known systems.

To provide a specific example of performing the IDCT, a 512 point transform is described, in conjunction with the following figures.

1. Precalculate Identified Computationally Intensive Values 702

Figure 7C:
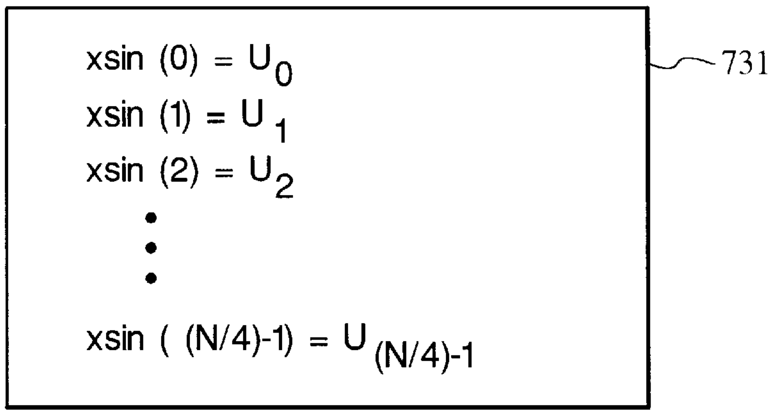
FIGS. 7C and 7D are examples of xsin and xcos tables, respectively.
Figure 7D:
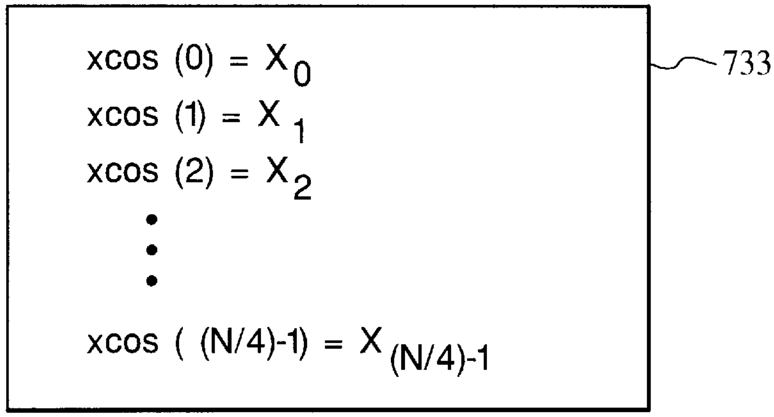

As has been before mentioned, xsin and xcos values 508 and 510 of FIG. 6B can be precalculated and placed in tables 731 and 733 since it is known that k is in the predetermined range of 0 to (N/4)−1 and the other numbers are constant. FIGS. 7C and 7D are examples of xsin and xcos tables 731 and 733, respectively.

To provide the IFFT table terms 516 and 518 of FIG. 6B can be precalculated, since all of the constants are sequences of ordered pairs where (n=0, k=1, . . . ,(N/4)−1), (n=1, k=1, . . . ,(N/4)−1) . . . (n=(N/4)−1, k=1, . . . ,(N/4)−1). As is also seen in FIG. 6B, term 512 provides a real component of an intermediate value and term 514 provides an imaginary component of the intermediate value.

Figure 7E:
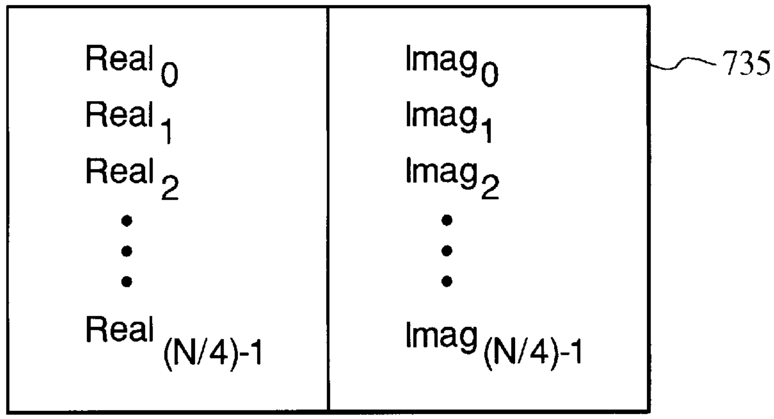
FIG. 7E is an example of the IFFT table.

FIG. 7E is an example of the IFFT table 735.

In a preferred embodiment, the values within each of the tables 731, 733 and 735 are stored in a manner to maximize the performance of the computer system when performing the inverse transform. For example, the values within the tables 731–735 could preferably be stored sequentially and aligned along natural boundaries such as word or cache boundaries to allow for efficient prefetching of the values within the computer system.

2. Pre-Inverse Transform Complex Multiply 704

In this embodiment, as before mentioned, the odd X entry value 701 which is fetched refers to the N/2*2*k−1 term (516) that is calculated in FIG. 6B and even X entry value 703 refers to 2*k term (518) that is calculated in FIG. 6B. By inspection of the loop 502 of FIG. 6B it is apparent that the 516 term proceeds from 255 to 1 in odd values and the 518 term proceeds from 0 to 254 in even values.

Referring back to FIG. 7B, if the array of input coefficients 608 is arranged in main memory 206 in consecutive order from 0 to 255 then one pass can be made through the pre-inverse transform step in each of the positive and negative directions using an array index step size of two. This feature can be implemented in a superscalar architecture through the use of an instruction, for example, the Power PC instruction, the load floating point single with address update (Ifsu) instruction.

Figure 8A:
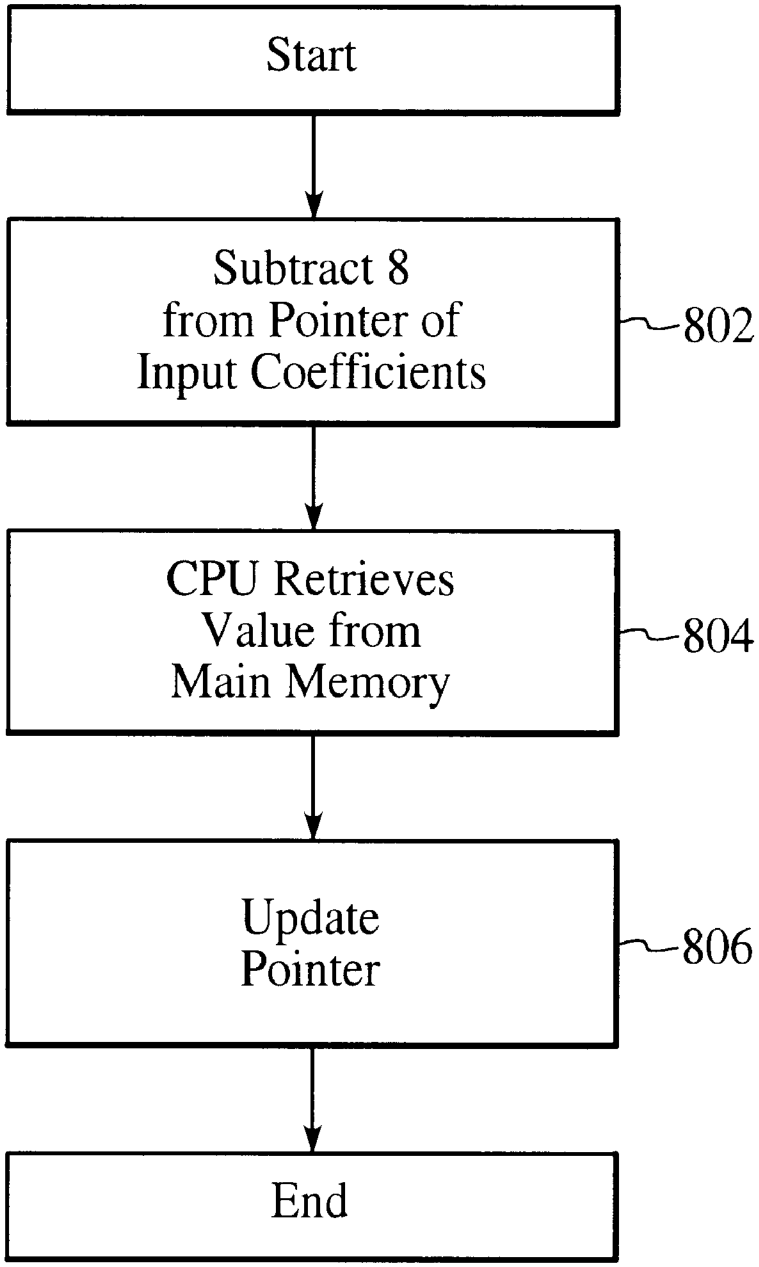
FIG. 8A is a flow chart showing the operation of the load floating point single with address update (lfsu) instruction when providing the odd input coefficients for the IDCT.
Figure 8B:
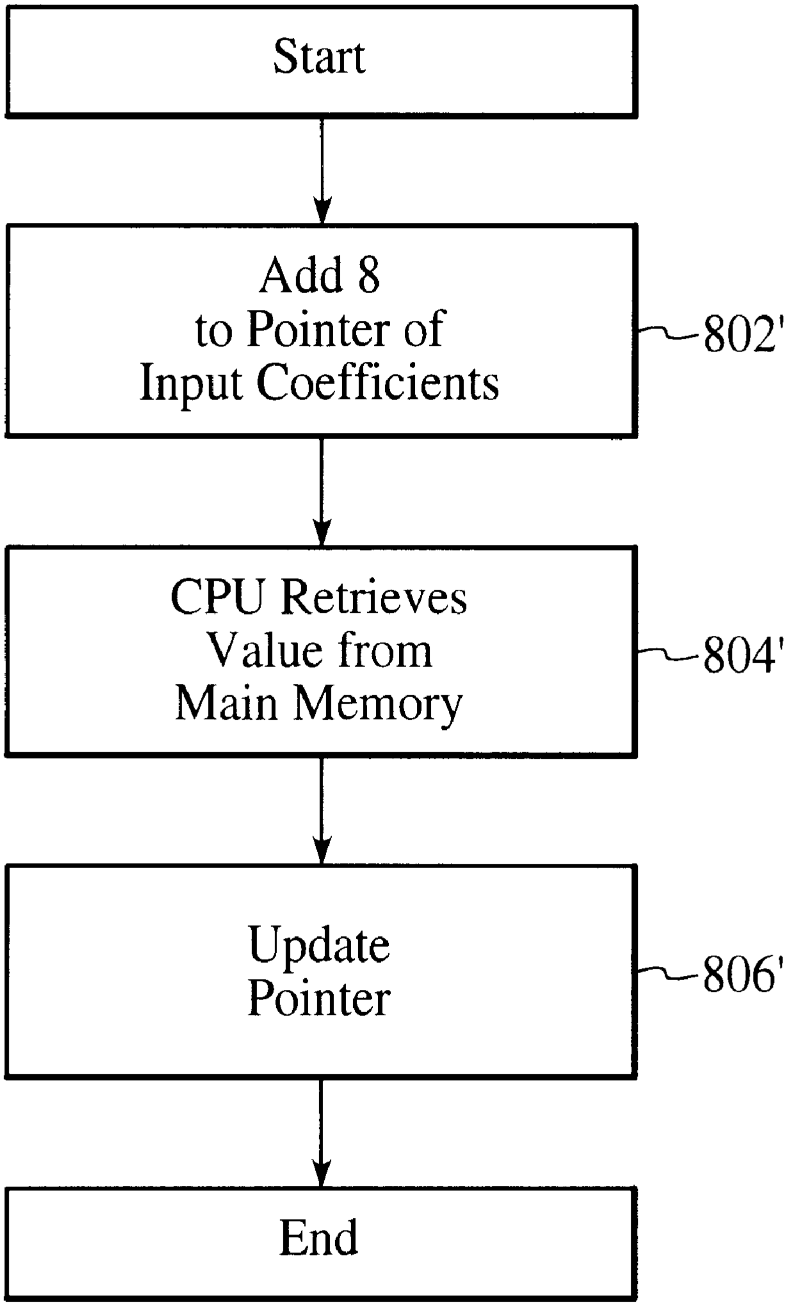
FIG. 8B is a flow chart of the operation of the lfsu instruction when providing the even input coefficients for the IDCT.

To more particularly describe this feature of the Ifsu instruction refer now to FIGS. 8A and 8B. FIG. 8A is a flow chart showing the operation of the lfsu instruction when providing the odd input coefficients or odd X entry values. FIG. 8B is a flow chart of the operation of the lfsu instruction when providing the even input coefficients or even X entry values.

Referring now to FIG. 8A, the Ifsu instruction first subtracts 8 from the pointer to the input coefficient to provide a step size of 2 and to provide the odd X entry value, via step 802. The CPU 202 (FIG. 7B) retrieves each value from the main memory 206, via step 804 and the pointer is updated, via step 806. This provides values $X_{255}$, $X_{253}$, $X_{251}$, . . . $X_1$ in order.

FIG. 8B is the reciprocal of that of FIG. 8A in that 8 is added to the pointer to input coefficients to provide each even X entry value, $X_0$, $X_2$, $X_4$ . . . $X_{252}$, $X_{254}$ in order.

Accordingly, the lfsu instruction can be utilized to step through the array of input coefficients within the memory without maintaining and updating pointers to specific values, and without performing explicit calculations of either the odd X entry value 701 or the even X entry value 703 (FIG. 7B) for each input coefficient.

Since the xsin and xcos function terms are in tables 731 and 733 (FIG. 7B), the xsin and xcos tables 731 and 733 can be stepped through in order for each input coefficient value. As above-mentioned, these values can advantageously be stored in a sequential and cache boundary aligned manner. Therefore these values can be prefetched more efficiently from a cache. As an added advantage certain Power PC instructions can be utilized to further speed up performance. Two Power PC instructions, floating point multiply add (fmadd) and floating point multiply subtract (fmsub) can be used to improve performance. As is well known, these instructions can perform a multiply and add or a multiply and subtract operation in one instruction substantially simultaneously.

FIG. 9 illustrates an exemplary assembly code that implements the features of the pre-inverse transform complex multiply step that can be implemented within a Power PC architecture.

3. Combined Inverse Transform And Post Inverse Transform Complex Multiply 706

By combining the inverse transform and post inverse transform step the z(n) 405 intermediate values are not needed, thereby eliminating one 0–127 iteration and also removing the need to maintain another 256 entry table of values in main memory 206 (FIG. 7B). Accordingly, the intermediate values in this step can be stored in registers present in the CPU 202. Therefore, these values from the registers do not require any main memory accesses which are relatively slow.

As before mentioned, terms 512 and 514 of FIG. 6B are precalculated, since the constants n and k are sequences of ordered pairs where (n=0, k=1, . . . , 127), (n=1, k=1, . . . , 127) . . . (n=127, k=1, . . . , 127). By reducing these calculations to a table lookup a number of regular floating point operations are eliminated as well as eliminating the very slow cosine and sine calculations. The calculation of the temporary value (Zcurrent) is a complex multiplication of Z(k) and values from the IFFT table 735 (FIG. 7B).

FIG. 10 is a first example of high level pseudocode for implementing step 706 of FIG. 7B in accordance with the present invention. In this embodiment, there is a pair of accumulator code equations 904 which has to be repeated (512/4) 128 times within loop 906 to provide the proper values for the output equation 908. In an improvement to minimize the overhead associated with this loop 906, refer now to FIG. 11.

FIG. 11 is a second example of high level pseudocode for implementing step 706 of FIG. 7B. In this embodiment the loop counter k=zero to N/16 and the accumulator code equations pairs 904 are evaluated four times, incrementing internal counter "count". In so doing, the loop 906' only has to be repeated 32 times, rather than the 128 times required by loop 906. As before mentioned, by repeating the accumulator loop pairs in this manner the overhead for loop maintenance is amortized.

FIG. 12 illustrates an exemplary assembly pseudocode utilizing Power PC instructions which implement the high level code of FIG. 11.

Accordingly, as is seen, a system and method is provided which optimizes an inverse transform for an audio compression decoding. Through precalculating identified values and providing combining the inverse transform complex multiply and post inverse transform complex multiply steps to provide a combined complex multiply operation the inverse transform can be implemented in software much more efficiently than by implementing it directly. In so doing, the decoding process for audio compression algorithms is significantly improved.

In a prior art embodiment, the method for performing the inverse discrete cosine transform (IDCT) in the AC-3 algorithm is extremely inefficient for software decoder implementations. In a preferred embodiment through the use of the present invention, the algorithm performance on a superscalar processor as measured by issued instructions is improved by a factor on the order of 43.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing an audio signal in an audio signal reception system, the method comprising the steps of:

a) receiving a digitally compressed audio signal;

b) decoding the digitally compressed audio signal, wherein the decoding comprises the steps of, b1) precalculating a plurality of identified values, which is computationally intensive) wherein the identified values comprise values which are used more than once in the iteration of steps b2) or b3);

b2) performing a pre-inverse transform complex multiply utilizing a first portion of the identified values and an array of input coefficients to provide a plurality of intermediate values; and b3) combining an inverse transform complex multiply and a post inverse transform multiply to provide a combined complex multiply operation, the combined complex multiply operation utilizing a second portion of the identified values and the plurality of intermediate values to provide the inverse transform for the array of input coefficients; and c) outputting the decoded audio signal to a speaker system.

2. The method of claim 1 in which the inverse transform of step b) comprises an inverse discrete cosine transform (IDCT).

3. The method of claim 2 in which the precalculating step b1) includes the step of storing the plurality of identified values in a plurality of tables in a memory of the computer system.

4. The method of claim 3 in which the array of input coefficients are stored in a table in the memory.

5. The method of claim 3 in which the plurality of identified values in the plurality of tables are stored in a predetermined manner.

6. The method of claim 3 in which the values in the plurality of identified of tables are stored sequentially and in cache boundary alignment.

7. The method of claim 3 in which the first portion of the identified values are stored in a first table and a second table, the identified values in the first table being defined by the term, cos(2*π*(8*k+1)/(8*N)) and the identified values in the second table being defined by the term, sin(2*π*(8*k+1)/(8*N)).

8. The method of claim 3 in which the second portion of the identified values are stored in the first table, the second table and a third table, the identified values in the third table being defined by the terms, cos(8*π*k*n/N), and sin (8*π*k*n/N).

9. The method of claim 1 in which the performing step b2) further comprises arranging the array of input coefficients in the memory in consecutive order.

10. The method of claim 9 in which the performing step b2) further comprises the step of utilizing a load floating point single with address update (1fsu) instruction to provide the array of input coefficients.

11. The method of claim 10 wherein the 1fsu instruction allows for one pass to be made through the performing step b2).

12. The method of claim 10 in which the performing step b2) further includes the step of utilizing a floating point multiply add instruction (fmadd) to provide the identified values from the first and second tables in a coordinated manner.

13. The method of claim 10 in which the performing step b2) further includes the step of utilizing a floating point subtract (fmsub) to provide the identified values from the first and second tables in a coordinated manner.

14. A system for providing an audio signal in an audio signal reception system, the system comprising:

means for receiving a digitally compressed audio signal;

means for decoding the digitally compressed audio signal, wherein the decoding means comprises, means for precalculating a plurality of identified values, wherein the identified values comprise values which are used more than once in the iteration of a performing means and a combining means;

means for performing a pre-inverse transform complex multiply utilizing a first portion of the identified values and an array of input coefficients to provide a plurality of intermediate values; and means for combining an inverse transform complex multiply and a post inverse transform multiply to provide a combined complex multiply operation, the combined complex multiply operation utilizing a second portion of the identified values and the plurality of intermediate values to provide the inverse transform for the array of input coefficients; and means for outputting the decoded audio signal to a speaker system.

15. The system of claim 14 in which the inverse transform of the decoding means comprises an inverse discrete cosine transform (IDCT).

16. The system of claim 15 in which the precalculating means includes means for storing the plurality of identified values in a plurality of tables in a memory of the computer system.

17. The system of claim 16 in which the array of input coefficients are stored in a table in the memory.

18. The system of claim 16 in which the plurality of identified values in the plurality of tables are stored in a predetermined manner.

19. The system of claim 16 in which the plurality of identified values in the plurality of tables are stored sequentially and in cache boundary alignment.

20. The system of claim 16 in which the first portion of the identified values are stored in a first table and a second table, the identified values in the first table being defined by the term, cos(2*π*(8*k+1)/(8*N)) and the identified values in the second table being defined by the term, sin(2*π*(8*k+1)/(8*N)).

21. The system of claim 16 in which the second portion of the identified values are stored in the first table, the second table and a third table, the identified values in the third table defined by the terms, cos(8*π*k*n/N), and sin(8*π*k*n/N).

22. The system of claim 14 in which the performing means of the decoding means further comprises means for arranging the array of input coefficients in the main memory in consecutive order.

23. The system of claim 22 in which the performing means further includes means for utilizing a load floating point single with address update (1fsu) instruction to provide the array of input coefficients.

24. The system of claim 23 wherein the 1fsu instruction allows for one pass to be made through the performing means.

25. The system of claim 23 in which the performing means further includes means for utilizing a floating point multiply add instruction (fmadd) to provide the identified values from the first and second tables in a coordinated manner.

26. The system of claim 23 in which the performing means further includes means for utilizing a floating point subtract (fmsub) to provide the identified values from the first and second tables in a coordinated manner.

27. A computer readable medium containing program instructions for providing an audio signal in an audio signal reception system, the instructions for:

a) receiving a digitally compressed audio signal;

b) decoding the digitally compressed audio signal, wherein the decoding comprises the instructions for, b1) precalculating a plurality of identified values, wherein the identified values comprise values which are used more than once in the iteration of steps b2) or b3);

b2) performing a pre-inverse transform complex multiply utilizing a first portion of the identified values and an array of input coefficients to provide a plurality of intermediate values; and b3) combining an inverse transform complex multiply and a post inverse transform multiply to provide a combined complex multiply operation, the combined complex multiply operation utilizing a second portion of the identified values and the plurality of intermediate values to provide the inverse transform for the array of input coefficients; and c) outputting the decoded audio signal to a speaker system.

* * * * *